United States Patent [19]

Catallo

[11] Patent Number: 5,477,887

[45] Date of Patent: * Dec. 26, 1995

[54] TUBULAR LINER FOR SOFTLINING PIPE REHABILITATION

[75] Inventor: Guilio Catallo, Webster, Tex.

[73] Assignee: Inliner, U.S.A., Houston, Tex.

[*] Notice: The portion of the term of this patent subsequent to Nov. 17, 2009, has been disclaimed.

[21] Appl. No.: 212,298

[22] Filed: Mar. 14, 1994

Related U.S. Application Data

[60] Continuation of Ser. No. 938,455, Aug. 31, 1992, abandoned, which is a division of Ser. No. 635,743, Dec. 20, 1990, Pat. No. 5,163,481.

[51] Int. Cl.⁶ .................................................... F16L 11/10
[52] U.S. Cl. ........................ 138/97; 138/98; 138/128
[58] Field of Search ....................... 138/97, 98, 170, 138/128, 151, 119, 171; 156/93, 203, 287, 94, 257, 294; 264/36, 269

[56] References Cited

U.S. PATENT DOCUMENTS

| | | |
|---|---|---|
| 130,303 | 8/1872 | Libby . |
| 143,661 | 10/1873 | Blake . |
| 154,725 | 9/1874 | Street . |
| 1,320,413 | 11/1919 | Reznicek . |
| 2,195,222 | 3/1940 | Neumair ......................... 93/2 |
| 2,595,408 | 5/1952 | Quest .......................... 61/12 |
| 3,927,464 | 12/1975 | Wallsten ....................... 29/454 |
| 4,009,063 | 2/1977 | Wood ........................ 156/71 |
| 4,064,211 | 12/1977 | Wood ........................ 264/95 |
| 4,247,345 | 1/1981 | Kadija et al. ................. 156/73 |
| 4,446,181 | 5/1984 | Wood ........................ 428/36 |
| 4,478,661 | 10/1984 | Lewis ......................... 156/92 |
| 4,508,582 | 4/1985 | Fink .......................... 156/93 |
| 4,593,721 | 6/1986 | Klenk et al. ................. 138/118 |
| 4,604,152 | 8/1986 | Liukko ....................... 156/93 |
| 4,684,419 | 7/1987 | Agosta ....................... 156/93 |
| 4,723,579 | 2/1988 | Hyodo et al. ............... 138/124 |
| 4,770,562 | 9/1988 | Muller et al. ............... 405/154 |
| 5,163,481 | 11/1992 | Catallo ....................... 138/98 |

FOREIGN PATENT DOCUMENTS

| | | |
|---|---|---|
| 2810991 | 9/1978 | Germany . |
| 29831 | 6/1919 | Norway . |
| 989870 | 4/1965 | United Kingdom . |

Primary Examiner—James E. Bryant, III
Attorney, Agent, or Firm—Tobor & Goldstein

[57] ABSTRACT

A tubular liner for use in softlining methods of pipe rehabilitation. The tubular liner is constructed of plastic materials or laminates of plastic material which have one or more resin-absorbing layers. The tubular liner of the present invention is made by stitching together the faces of the liner material to form a tube. The seam of the tube is then sealed and the sealed seam is fused to the tube. The resulting structure provides a durable tubular liner that resists rupture or leakage of the seam during use in pipe rehabilitation operations.

4 Claims, 2 Drawing Sheets

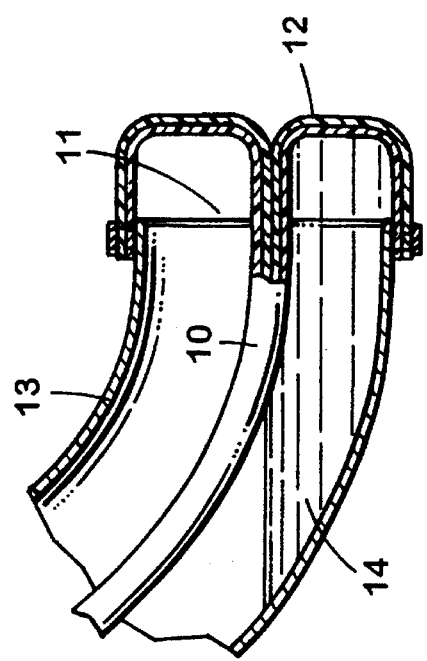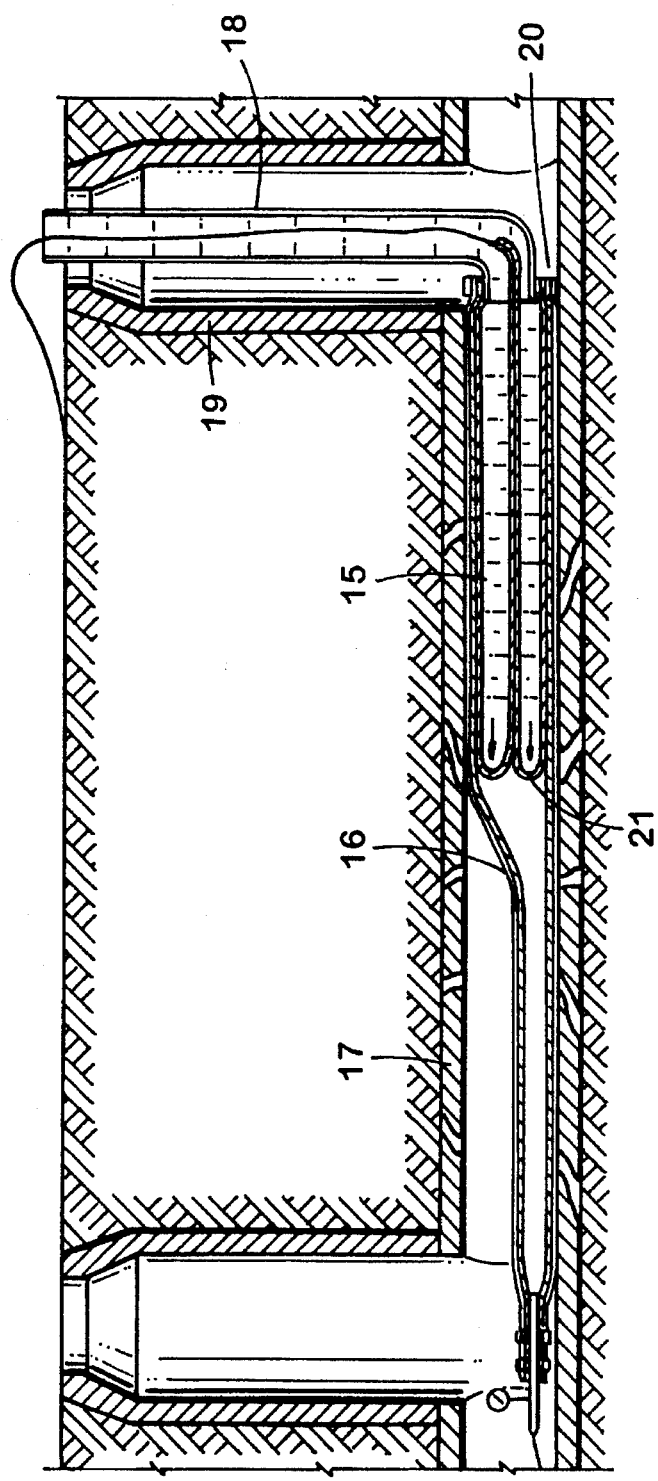

TUBULAR LINER FOR SOFTLINING PIPE REHABILITATION

This application is a continuation of application Ser. No. 07/938,455, filed Aug. 31, 1992, now abandoned which is a divisional of Ser. No. 07/635,743 filed Dec. 20, 1990, now U.S. Pat. No. 5,163,481.

BACKGROUND OF THE INVENTION

The present relates to the manufacture of a tubular liner for use in softlining pipe rehabilitation. Various softlining methods of rehabilitating a pipe conduit which is buried underground are known. Generally speaking, such methods involve the use of a flexible lining hose which is subsequently converted into a rigid pipe liner by use of thermosetting resins. The flexible lining hose or tube generally has a diameter which is slightly smaller than the inner diameter of the pipe conduit to be repaired.

One such softlining method is shown in U.S. Pat. No. 4,064,211 in which a lining hose is everted into the pipe conduit to be rehabilitated. In this method the lining hose is introduced into the interior of the pipe conduit by turning one end region over the other and by causing the turned over region to gradually advance into the interior of the pipe conduit. This process is called eversion. During the performance of this step, the resin soaked layer which is originally located at the interior is gradually transferred to the exterior of the lining hose. Relatively high forces are needed for the gradual turning over of the lining hose owing to the expansion work to be performed at the turned over region.

Another softlining method is described in U.S. Pat. No. 4,770,562. In that patent, the evertible lining hose is referred to as an auxiliary hose and is generally comprised of plastic materials. In such a softlining method, the auxiliary hose is everted using high water pressure within a collapsed resin-absorbent liner. After the auxiliary hose is everted to expand the collapsed liner, the auxiliary hose is removed from the pipe conduit. This auxiliary hose is then reused to expand another section of collapsed resin absorbent liner.

When a liner or tube is used to expand a collapsed liner in this manner, the tubular liner must be strong enough to maintain its integrity under the pressures created by eversion process and not allow leakage of fluid through the seam of the tubular liner.

In each of the methods described above, the construction of the seam of the tube or liner is important. If fluid leaks through the seam a substantially poorer structure results upon curing of the resin. For example, if the tubular liner is resin-impregnated and everted using water, it is important that the water not leak through the seam of the tubular liner. If the water contacts the resin, it impairs the curing ability of the resin.

U.S. Pat. No. 4,446,181 also describes the manufacture of tubular laminates which are useful in softlining pipe rehabilitation methods. Those tubular laminates are made by stitching together the butted edges of a flat web formed from a resin-absorbing layer, on one side of which is an impermeable layer. Once sewn in a tube configuration, a sealing ribbon or coating is applied on the outside of the tubular laminate over the stitching to prevent leakage through the stitching holes during installation.

The present invention provides a new and improved tubular liner and method of forming tubular liners for use in softlining pipe rehabilitation. The present invention provides a tubular liner which can withstand multiple eversions by high pressure fluid without leakage or rupture.

SUMMARY OF THE INVENTION

The present invention provides a tubular liner for use in softlining pipe rehabilitation which can maintain its integrity after multiple eversions without leakage or rupture and a method for manufacturing the liner. The method comprises stitching the faces 6f a liner material together to form a tube having a seam running the length of the tube; fusing the stitched seam so that the holes of the stitching are sealed; and fusing the sealed seam to the tubular liner to form a flat outer surface.

BRIEF DESCRIPTION OF THE DRAWINGS

FIGS. 1(a) and 1(b) show the eversion of a tube in a pipe conduit.

FIGS. 2 (c) and (d) show the fusing or welding of the stitched seam to seal the holes created by the stitching.

FIGS. 2 (e) and 2 (f) show the fusing or welding of the stitched seam to the liner.

DETAILED DESCRIPTION

Figure 2A:
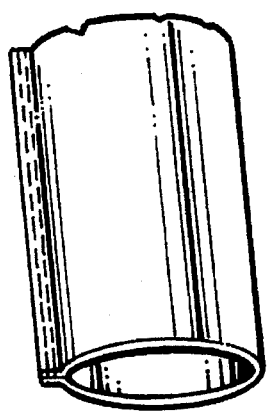
FIGS. 2 (a) and 2 (b) show the stitching of the inner faces of the liner material together to form a tube.
Figure 2B:
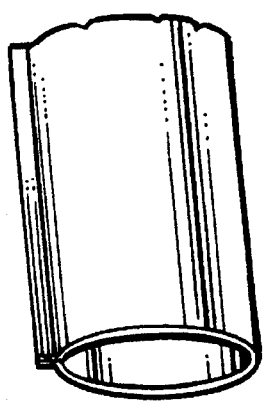
Figure 2C:
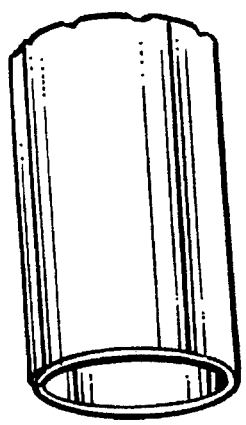
Figure 2D:
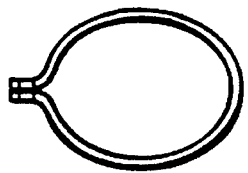
Figure 2E:
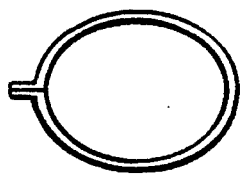
Figure 2F:
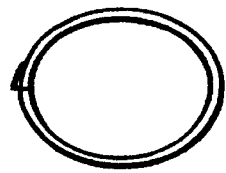

The present invention provides a tubular liner for use in rehabilitating or restoring a pipe conduit which has a predetermined inner diameter and is buried underground, for example a sewer pipe. Liners used for pipe rehabilitation are conventionally of two types. The first type is a laminate having one or more resin-absorbing layers and at least one impermeable or semi-permeable layers. The resin-absorbing layer is normally constructed of needled felt. The outer layer of the laminate is normally an impermeable plastic material such as polyethylene or polyurethane which can also be reinforced. The second type of liner is a tube constructed of a plastic material (such as polyvinyl chloride, polyurethane, and other such materials) and fiber-reinforced plastic materials.

Depending on the type of installation, liners can be introduced into the pipe conduit by an eversion process as shown in FIG. 1a. The tubular liner (10) is typically anchored to the pipe conduit opening (11). The turned-over-region (12) is partially received within the pipe conduit. A pipe (13) is also attached to the pipe conduit opening (11) and extends to a fluid source. The purpose of this pipe is to provide a means for carrying a fluid and pressure to the turned-over-region. A fluid (14) is pumped to fill the space created by the pipe (13) and the tubular liner (10). The fluid creates pressure which causes the tubular liner to expand and the turned-over-region (12) to advance through the pipe conduit.

FIG. 1b shows the eversion of a tubular liner (15) into a collapsed liner (16) which has been pulled into a sewer pipe (17). The pipe for carrying fluid (18) extends from the sewer pipe (17) through a manhole (19) to the surface. The collapsed liner, tubular liner, and pipe for carrying fluid are anchored at the sewer pipe opening (20). As fluid is pumped from the surface, the turned-over-region (20) is advanced within the collapsed liner and pressure from the fluid expands the tubular liner, which in turn expands the collapsed liner.

It is important in pipe relining applications that the seam of the tubular liner be sealed. The seam must be sealed to prevent leakage through the seam of fluid on one side of the liner and resin or other chemicals on the other side. Problems arise with tubular liners because the seam of the liner is the weakest part of the structure and experiences great stresses during the eversion process. As a result, failures such as bursting of the seam and leakage through the seam frequently occur during installation.

The liner materials suitable for making the tubular liner of the present invention include any material capable of being fused or welded together. For example, plastic materials such as polyvinyl chloride, polyurethane, and other suitable plastics, as well as fiber reinforced plastics. Laminates having one or more resin-absorbing layers and an impermeable or semi-permeable layer are also suitable materials for making these tubular liners. The method of the present invention is applicable to the two conventional types of liners used in softlining pipe rehabilitation, as well as for other applications. The preferred materials for reusable tubular liners are fiber reinforced polyvinyl chloride and polyurethane.

Construction of the tubular liner of the present invention is shown in the drawings. The preferred embodiment is shown in FIGS. 2 (a) through (f). In FIG. 2 (a), the inner faces of a sheet of liner material are stitched together to form a tubular body. A cross sectional view is shown in FIG. 2 (d). In this embodiment a double line of stitching is made; however, whether a single stitch line or multiple stitch lines are made is not critical to the present invention.

Once the liner material is sewn together to the desired length of the tube, the seam is then fused or welded to seal to the seam as shown in FIGS. 2 (d) and (e). In the fusing or welding process the holes created by the stitching are sealed so that no leakage occurs through the seam. The preferred method of fusing or welding the seam is to use a high frequency welding, which is known as "K-Bar" welding. The K-Bar weld melts the liner to the stitching and seals the holes created by the stitches. However, other techniques for fusing or sealing the seam may also be used.

In the next step, the sealed seam is fused or welded to the tubular liner itself as shown in FIGS. 2 (c) and (f). This fusion or weld provides additional reinforcement of the seam and creates a flat outer surface for the tubular liner. The separate steps of fusing the holes of seam and fusing the seam to the tubular liner may also be performed in the same step.

Figure 3A:
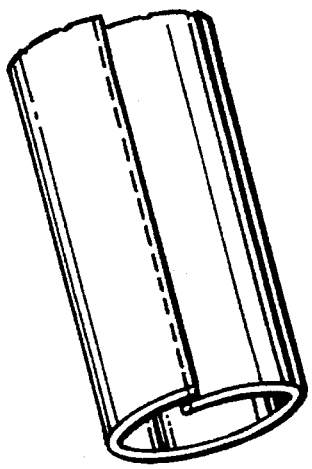
FIGS. 3 (a)–(c) show the stitching of overlapped faces of the liner material to form a tube.
Figure 3B:
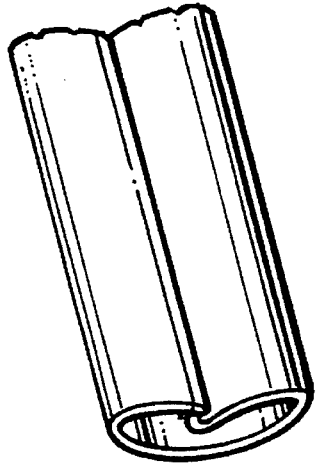
Figure 3C:
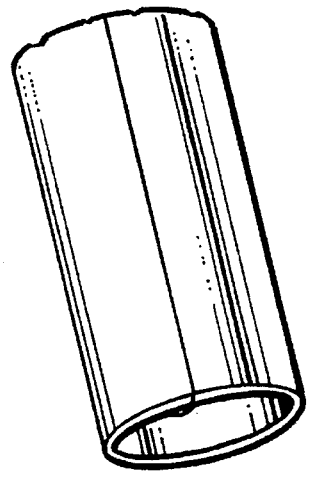

In another embodiment, the faces of the liner material are overlapped and stitched as shown in FIG. 3 (a). The overlapped faces of the liner material are stitched together to form a tubular body using single or multiple lines of stitching. After the tube is sewn, the seam is fused as previously described. The fused seam is then folded on to the tube itself (FIG. 3 (b)) and fused (FIG. 3 (c)) again to provide additional reinforcement. Again, the separate fusing steps may also be performed at the same time.

The tubular liner of the present invention can be made in a continuous process. The tubular liners can be made in variable lengths and variable diameters to suit specific applications.

The following is an example of the use of the tubular liner in accordance with the present invention, but the example is not intended to limit the invention in any way. In one softlining application, a felt lining hose which is impregnated with a thermosetting resin is pulled into a pipe conduit using a rope or cable and a winch. Once the collapsed felt hose is pulled into position, a tubular liner in accordance with the present invention is partially received within the felt lining hose with a turned over region. The turned over region of the tubular liner gradually advances through the felt lining hose as a result of pressure from fluid which is introduced from the surface through the tubular liner. Pressure exerted on the tubular liner and resulting pressure on the felt lining hose causes the felt lining hose to expand and to be shaped to conformingly line the pipe conduit. Once the felt lining hose is forced in place by the fluid pressure, hot water is recirculated through the tubular liner to induce curing of the thermosetting resin. The tubular liner in accordance with the present invention can be removed upon curing of the resin and reused in subsequent installations.

What is claimed:

1. A tubular liner for softlining pipe rehabilitation which maintains its integrity after eversions without leakage or rupture comprising:

a liner material having its faces fixed together to form a tubular body having a seam running a length of said tubular body;

wherein said seam is fused to form a liquid tight seam; and wherein said liquid tight seam is folded onto and fused to said tubular body.

2. The tubular liner of claim 1 wherein said liner material is selected from the group consisting of polyvinyl chloride, polyurethane, polyethylene, reenforced plastics, and laminates of resin-absorbing material.

3. The tubular liner of claim 1 wherein said seam is a stitched seam.

4. The tubular liner of claim 1 wherein said faces of said liner material are overlapped when fixed together.

* * * * *